United States Patent
Okada et al.

(10) Patent No.: US 8,085,870 B2
(45) Date of Patent: Dec. 27, 2011

(54) TRANSMITTER

(75) Inventors: Takashi Okada, Kodaira (JP); Jun Watanabe, Kodaira (JP); Takahiro Todate, Kodaira (JP); Norio Hasegawa, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 479 days.

(21) Appl. No.: 12/309,140

(22) PCT Filed: Mar. 20, 2007

(86) PCT No.: PCT/JP2007/056510
§ 371 (c)(1),
(2), (4) Date: Jan. 8, 2009

(87) PCT Pub. No.: WO2008/018200
PCT Pub. Date: Feb. 14, 2008

(65) Prior Publication Data
US 2009/0245414 A1 Oct. 1, 2009

(30) Foreign Application Priority Data
Aug. 10, 2006 (JP) .................................. 2006-218702

(51) Int. Cl.
H04L 25/49 (2006.01)
(52) U.S. Cl. ........................................ 375/297; 375/146
(58) Field of Classification Search .................. 375/260, 375/267, 296, 297, 146
See application file for complete search history.

(56) References Cited

U.S. PATENT DOCUMENTS

| 2005/0063485 A1 | 3/2005 | Hasegawa et al. |
| 2005/0201498 A1 | 9/2005 | Nakai |
| 2006/0189282 A1 | 8/2006 | Hasegawa et al. |

FOREIGN PATENT DOCUMENTS

| JP | 11-8566 | 1/1999 |
| JP | 2004-166245 | 6/2004 |
| JP | 2005-20505 | 1/2005 |
| JP | 2005-94426 | 4/2005 |
| JP | 2005-260860 | 9/2005 |
| JP | 2006-115096 | 4/2006 |
| WO | 2004/038973 | 5/2004 |
| WO | 2006/041054 | 4/2006 |

OTHER PUBLICATIONS

International Search Report issued May 29, 2007 in the International (PCT) Application of which the present application is the U.S. National Stage.
Notification of Reasons for Refusal (with English translation) issued Jun. 30, 2010 in corresponding Japanese Patent Application No. 2006-218702.

*Primary Examiner* — David Lugo
(74) *Attorney, Agent, or Firm* — Wenderoth Lind & Ponack, L.L.P.

(57) ABSTRACT

A transmitter suppresses peak power occurring in a transmission signal. The transmitter generates peak suppression signals for suppressing the peak power in the transmission signal respectively, synthesizes the peak suppression signals generated, and subtracts a signal as a synthesis result from the transmission signal.

6 Claims, 9 Drawing Sheets

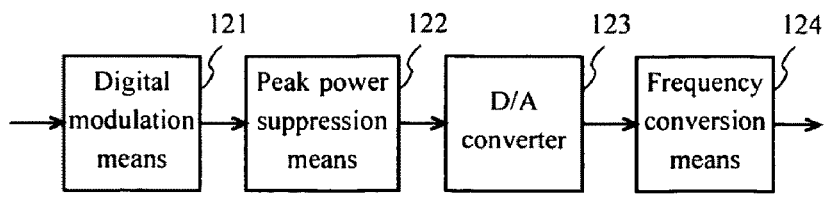
Fig.7
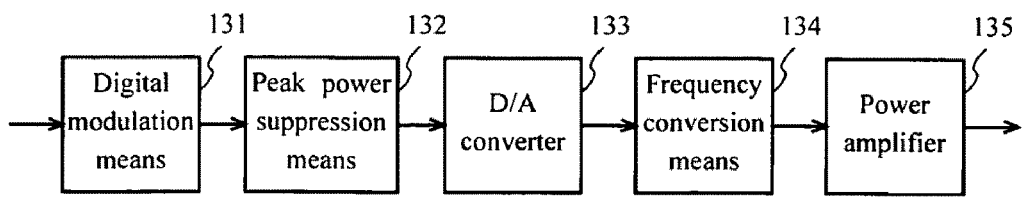
Fig.8
| Peak power suppression means | ACLR[dBc] | EVM[%] | PCDE[dB] |
|---|---|---|---|
| Comparative art | -62.4 | 9.0 | -33.6 |
| The embodiment | -70.6 | 8.5 | -36.4 |
Fig.9

TRANSMITTER

BACKGROUND OF THE INVENTION

1. Technical Field

The present invention relates to a transmitter in a mobile communication system that uses a communication system such as Wide band-Code Division Multiple Access (W-CDMA) to perform radio communication, and particularly relates to a technique for detecting peak power occurring in a transmission signal and suppressing the peak power.

2. Background Art

A transmitter has peak power suppression means to detect peak power occurring in a transmission signal and suppress the peak power (for example, refer to patent document 1).

FIG. 13 shows an example of an internal configuration of peak power suppression means 203.

Power calculating means 211 calculates a power value for each sample for an input signal. Peak power detection means 212 compares a power value of the input signal to a threshold power value being set for each sample, and determines a sample having a larger power value than the threshold power value as peak value. Peak suppression ratio calculating means 213 obtains a ratio between a peak power value and the threshold power value, and calculates a certain ratio (peak suppression ratio) for suppressing the peak power to a threshold level. Window function multiplication means 214 multiplies the peak suppression ratio by a window function beforehand stored in a memory, and determines a suppression ratio to the peak power and samples around the peak power.

When the peak power is continuously detected, a peak power having a maximum level in the continuous peak power is selected and multiplied by the window function. Thus, peak power around the maximum peak is also suppressed well.

As the window function w(t), for example, Hanning window as expressed by formula (1), Gaussian window as expressed by formula (2), and Kaiser window as expressed by formula (3) are known, and an optimum window that provides an excellent characteristic can be selectively used.

Formula 1

$$\text{Hanning window: } w(t) = 0.5 + 0.5\cos\left(\pi \times \frac{t}{N/2}\right) \quad \text{formula (1)}$$

$$\text{however, } -\frac{N}{2} \leq t \leq \frac{N}{2}$$

N: number of samples of window function

Formula 2

$$\text{Gaussian window: } w(t) = e^{-\alpha t^2} \ (\alpha \text{ is constant}) \quad \text{formula (2)}$$

$$\text{however, } -\frac{N}{2} \leq t \leq \frac{N}{2}$$

N: number of samples of window function

Formula 3

$$\text{Kaiser window: } w(t) = \frac{I_0\left[\alpha\sqrt{1-\left(\frac{1-\frac{2(t+N/2)}{N}}{}\right)^2}\right]}{I_0(\alpha)} \quad \text{formula (3)}$$

$$I_0(\alpha) = 1 + \sum_{m=1}^{M}\left[\frac{(\alpha/2)^m}{m!}\right]^2$$

$(\alpha, M \text{ is constant})$ $$\text{however, } -\frac{N}{2} \leq t \leq \frac{N}{2}$$

N: number of samples of window function

A windowing multiplier 215 multiplies the peak suppression ratio multiplied by the window function and an input signal together for each sample so as to generate a peak suppression signal having a frequency band being controlled to be in a neighborhood of a carrier by windowing. A subtractor 216 subtracts the peak suppression signal from a transmission signal (input signal), thereby suppresses peak power in the transmission signal to a set threshold level.

Patent document 1
JP-A-2005-20505

SUMMARY OF THE INVENTION

In a transmitter having an amplifier (transmit amplifier), a technique of performing peak power suppression to a transmission signal is an important technique for reducing a peak to average power ratio (PAPR), and thus reducing back-off of a power amplifier (PA) so as to improve power efficiency of the power amplifier. If PAPR is lower, a power amplifier having a lower saturation level can be used, leading to reduction in cost of the power amplifier.

In the peak power suppression means 201 as shown in FIG. 13, a peak suppression signal is subjected to windowing in order to suppress a frequency band of distortion caused by peak suppression to be in a neighborhood of a carrier. However, this allows degradation in spectrum waveform, therefore a peak suppression level is limited to satisfy a radio characteristic standard such as the 3GPP standard, in addition, such means has a problem that since a power suppression level around the peak is also large, reduction in power of a transmission signal, or degradation in signal quality due to amplitude variation is large. Moreover, a method is proposed as a different peak suppression method, in which a peak suppression signal, which is band-limited to the same band as that of a transmission signal, is generated and provided to the transmission signal. However, the method has a problem that power is raised around a peak in some sample, which generates additional peak power.

The invention was made in the light of the above circumstances, and an object of the invention is to provide a transmitter that can effectively suppress peak power occurring in a transmission signal.

To achieve the object, a transmitter according to the invention suppresses peak power in a transmission signal according to the following configuration.

That is, peak-suppression-signal generating means generate peak suppression signals for suppressing peak power in the transmission signal respectively. Peak-suppression-signal synthesizing means synthesizes peak suppression signals generated by the plurality of peak-suppression-signal generating means. Subtraction means subtracts a signal as a synthesis result given by the peak-suppression-signal synthesizing means from the transmission signal.

Therefore, peak power occurring in a transmission signal can be effectively suppressed.

As a layout of the plurality of peak-suppression-signal generating means, various kinds of layout may be used. For example, series layout or parallel layout may be used. Alternatively, series layout may be used in combination with parallel layout.

As a signal to be a source for generating a peak suppression signal by each peak-suppression-signal generating means, various signals may be used. For example, a transmission signal, from which a peak suppression signal given by a previous stage is subtracted, may be used. Alternatively, a transmission signal (being not subjected to such subtraction) may be used.

A transmitter according to the invention is designed to have the following configuration as a configuration example.

That is, the plural, N pieces of the peak-suppression-signal generating means are provided, and disposed in series. (N−1) pieces of suppression signal subtraction means are provided while being disposed in series. peak-suppression-signal generating means in a first stage is inputted with the transmission signal and generates a peak suppression signal. Suppression signal subtraction means in a first stage subtracts the peak suppression signal, which is generated by the peak-suppression-signal generating means in the first stage, from the transmission signal. Suppression signal subtraction means in an ith (i=2 to N−1) stage subtracts a peak suppression signal, which is generated by peak-suppression-signal generating means in an ith stage, from a signal as a subtraction result given by (i−1)th suppression signal subtraction means. Peak-suppression-signal generating means in a jth (j=2 to N) stage is inputted with a signal as a subtraction result given by suppression signal subtraction means in a (j−1)th stage.

Therefore, peak power occurring in a transmission signal can be effectively suppressed by a configuration where a plurality of peak-suppression-signal generating means are disposed in series.

A transmitter according to the invention is designed to have the following configuration as a configuration example.

That is, at least one piece of peak-suppression-signal generating means among the plurality of peak-suppression-signal generating means generates a peak suppression signal being band-limited using a filter coefficient.

Therefore, for example, in at least one (for example, in a previous stage including the first stage) of the plurality of peak-suppression-signal generating means disposed in series, a peak suppression signal is band-limited using a filter coefficient, thereby peak power can be suppressed well.

As a configuration example, a transmitter according to the invention, characterized by having storage means that stores correspondence between a frequency pattern of a carrier included in the transmission signal and a filter coefficient, and carrier detection means that detects the frequency pattern of the carrier included in the transmission signal, wherein the peak-suppression-signal generating means using the filter coefficient uses a filter coefficient corresponding to a pattern detected by the carrier detection means based on the stored content in the storage means.

As a configuration example, a transmitter according to the invention, characterized by having storage means that stores a filter coefficient corresponding to a 1-carrier baseband signal, and carrier detection means that detects frequency of a carrier included in the transmission signal, wherein peak-suppression-signal generating means using the filter coefficient changes a band of the filter coefficient stored in the storage means for each frequency of each carrier detected by the carrier detection means so that the band is corresponding to frequency of each of the carriers, and thus synthesizes filter coefficients produced for each frequency of each of the carriers, and uses a filter coefficient as a result of the synthesis.

BRIEF DESCRIPTION OF THE DRAWINGS

FIG. 7 shows a diagram showing a configuration example of a transmitter according to an eighth embodiment of the invention.

FIG. 8 shows a diagram showing a configuration example of a transmit amplifier according to a ninth embodiment of the invention.

FIG. 9 shows a diagram showing an example of comparison of performance of peak power suppression means.

DETAILED DESCRIPTION OF THE INVENTION

A preferred embodiment according to the invention will be described with reference to drawings.

The embodiment shows a case where peak power suppression means is used for a transmitter of base station equipment that uses W-CDMA system to communicate with mobile station equipment.

Moreover, the embodiment shows a case that an intermediate frequency (IF) signal is processed. The signal is configured by an I-phase component and a Q-phase component. However, to simplify description, the I-phase component and the Q-phase component are shown or described assuming that they are collectively regarded as one signal except a case when particularly required. To consider the I-phase component and the Q-phase component of a signal, for example, a peak suppression ratio to a signal peak is calculated based on a level ($I^2+Q^2$) calculated from a value I of the I-phase component of the signal and a value Q of the Q-phase component thereof, and the I-phase component and the Q-phase component are multiplied by one peak suppression ratio respectively.

The embodiment shows a case that the peak power suppression means is used for an IF limiter that processes the intermediate frequency (IF) signal. However, the peak power suppression means can be used for a BB limiter that processes a baseband (BB) signal as a different configuration example.

For example, the BB limiter handles all carriers at 0 MHz for processing the carriers, and the IF limiter handles a transmission signal including a plurality of carriers having different frequencies from one another for processing the carriers.

Embodiment 1

A first embodiment of the invention is described.

Figure 1:
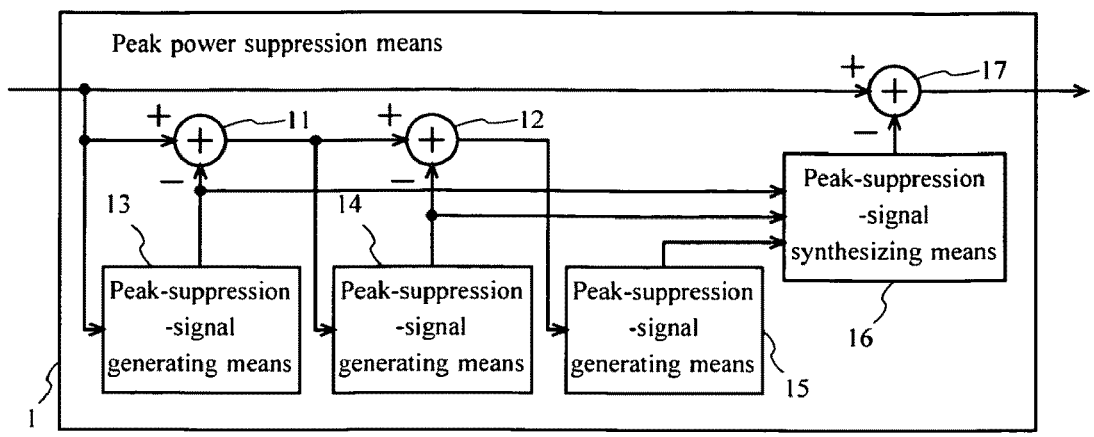
FIG. 1 shows a diagram showing a configuration example of peak power suppression means according to a first embodiment of the invention.

FIG. 1 shows a configuration example of peak power suppression means 1 according to an embodiment of the invention.

The peak power suppression means 1 of the embodiment includes two subtractors 11 and 12, three peak-suppression-signal generating means 13, 14 and 15, and a piece of peak-suppression-signal synthesizing means 16 for generating peak suppression signals, and a subtractor 17 for subtracting a peak suppression signal.

Figure 3:
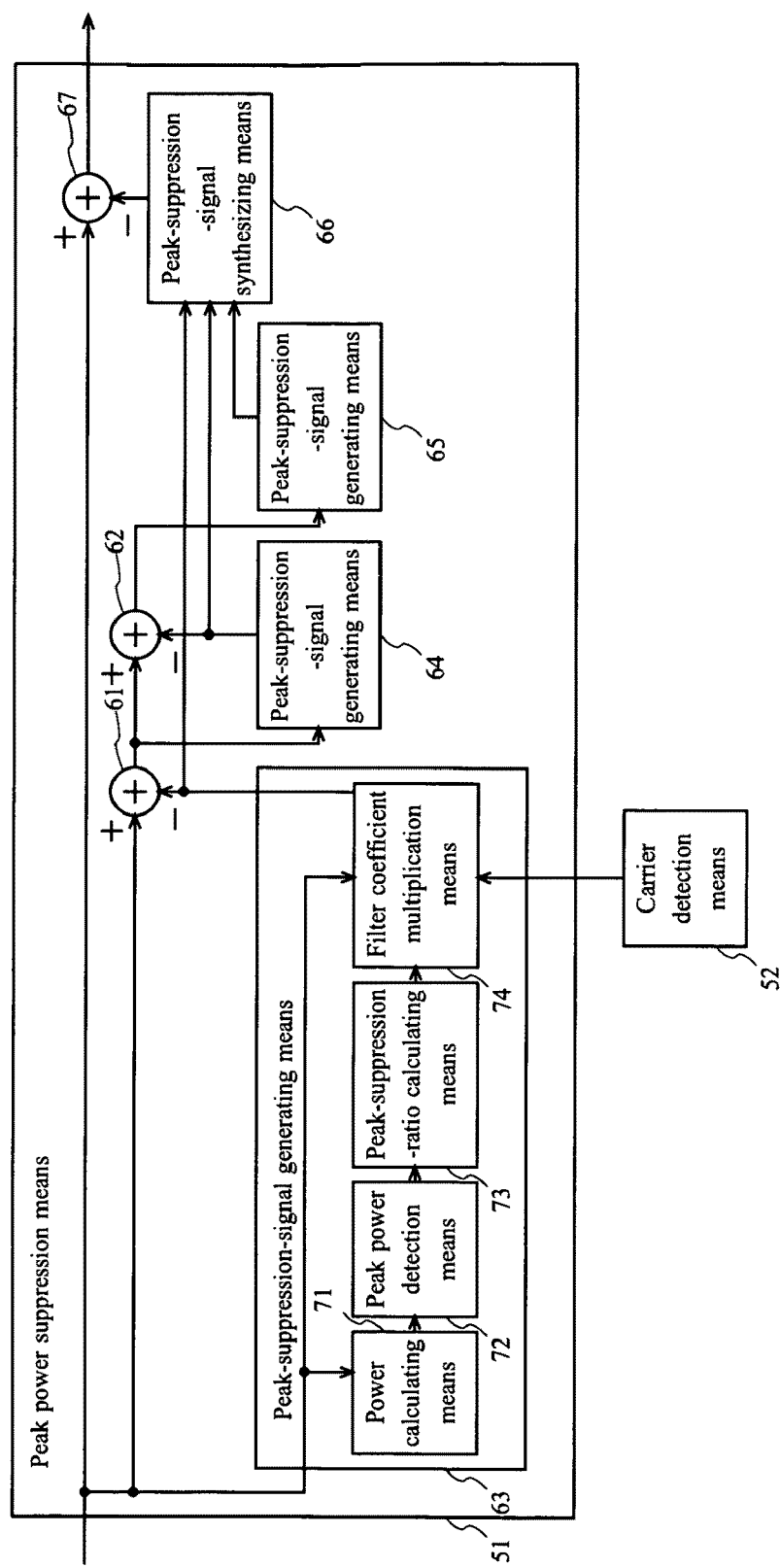
FIG. 3 shows a diagram showing a configuration example of peak power suppression means according to a third embodiment of the invention.
Figure 13:
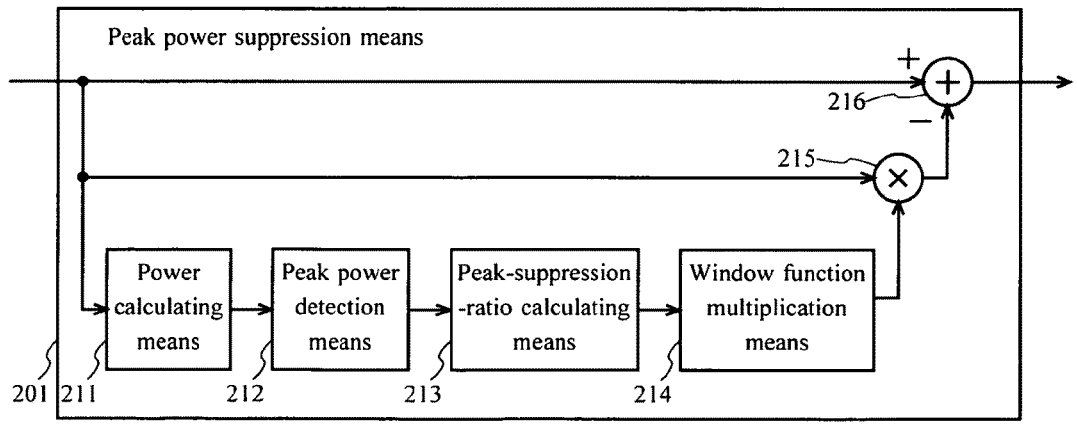
FIG. 13 shows a diagram showing a configuration example of peak power suppression means.

Each of the peak-suppression-signal generating means 13, 14 and 15 may be optionally configured. For example, they may be configured in the same way, or in different ways from one another. Alternatively, a configuration may be used, in which not all of them, but some of them are the same. As a configuration of each of the peak-suppression-signal generating means 13, 14 and 15, for example, the same configuration as that shown in FIG. 13, a configuration where the window function multiplication means 214 is removed from the configuration as shown in FIG. 13, or a configuration as shown in FIG. 3 can be used.

An example of operation performed by the peak power suppression means 1 of the embodiment is shown.

A signal to be a transmission object of a transmitter is inputted, and the input signal is inputted into the peak-suppression-signal generating means 13 in a first stage, the subtractor 11 in a first stage for generating a peak suppression signal, and the subtractor 17 for subtracting a peak suppression signal.

The peak-suppression-signal generating means 13 in the first stage generates a peak suppression signal for the input signal, and outputs the peak suppression signal to the subtractor 11 in the first stage and the peak suppression signal synthesizing means 16.

The subtractor 11 in the first stage subtracts the peak suppression signal, which is inputted from the peak-suppression-signal generating means 13 in the first stage, from the inputted transmission signal, and outputs a signal as a result of the subtraction to the peak-suppression-signal generating means 14 in a second stage and the subtractor 12 in a second stage.

The peak-suppression-signal generating means 14 in the second stage generates a peak suppression signal for an input signal from the subtractor 11 in the first stage, and outputs the peak suppression signal to the subtractor 12 in a second stage and the peak suppression signal synthesizing means 16.

The second-stage subtractor 12 subtracts the peak suppression signal, which is inputted from the peak-suppression-signal generating means 14 in the second stage, from the signal inputted from the subtractor 11 in the first stage, and outputs a signal as a result of the subtraction to the peak-suppression-signal generating means 15 in a third stage.

The peak-suppression-signal generating means 15 in the third stage generates a peak suppression signal for an input signal from the subtractor 12 in the second stage, and outputs the peak suppression signal to the peak suppression signal synthesizing means 16.

The peak suppression signal synthesizing means 16 synthesizes the peak suppression signals inputted from the three pieces of peak-suppression-signal generating means 13, 14 and 15 so as to generate one peak suppression signal (synthesized peak suppression signal), and outputs the generated synthesized peak suppression signal to the subtractor 17.

The subtractor 17 subtracts the synthesized peak suppression signal, which is inputted from the peak suppression signal synthesizing means 16, from the inputted transmission signal, and outputs a signal as a result of the subtraction as a transmission signal in which peak power is suppressed.

In the embodiment, as the peak suppression signal, a signal is generated in a way that when the signal is subtracted from a transmission signal, the relevant peak power can be correspondingly suppressed. That is, a signal corresponding to the peak power to be suppressed is generated.

The embodiment shows a case that the number of pieces of peak-suppression-signal generating means 13 to 15 (number of stages) is three. However, any number of pieces may be used if the number is 2 or more.

As hereinbefore, in the embodiment, the peak power suppression means 1, which suppresses peak power in a digital IQ transmission signal, internally includes N (N is an integer of 2 or more) pieces of peak-suppression-signal generating means 13 to 15, the peak suppression signal synthesizing means 16 that outputs one peak suppression signal obtained by synthesizing at least one peak suppression signal among N peak suppression signals generated by the N pieces of peak-suppression-signal generating means 13 to 15, and the subtractor 17 that subtracts the synthesized peak suppression signal outputted from the peak suppression signal synthesizing means 16 from the transmission signal, and outputs a transmission signal in which peak power is suppressed.

In the peak power suppression means 1 of the embodiment, the N pieces of peak-suppression-signal generating means 13 to 15 are continuously disposed, and the peak-suppression-signal generating means 13 in the first stage is inputted with a transmission signal as an input signal, and the peak-suppression-signal generating means 14 or 15 in the second or later stage is inputted with a synthesized signal (a differential signal in the embodiment) of a peak suppression signal or peak suppression signals and the transmission signal as an input signal, the peak suppression signal/signals being outputted from any peak-suppression-signal generating means disposed in previous stages of the respective means 14 or 15.

Therefore, the peak power suppression means 1 of the embodiment sums (synthesizes) a plurality of peak suppression signals generated by a plurality of peak-suppression-signal generating means, and subtracts a signal as a result of the sum from a transmission signal, thereby the means 1 can effectively detect peak power occurring in the transmission signal and suppress the peak power.

Embodiment 2

A second embodiment of the invention is described.

Figure 2:
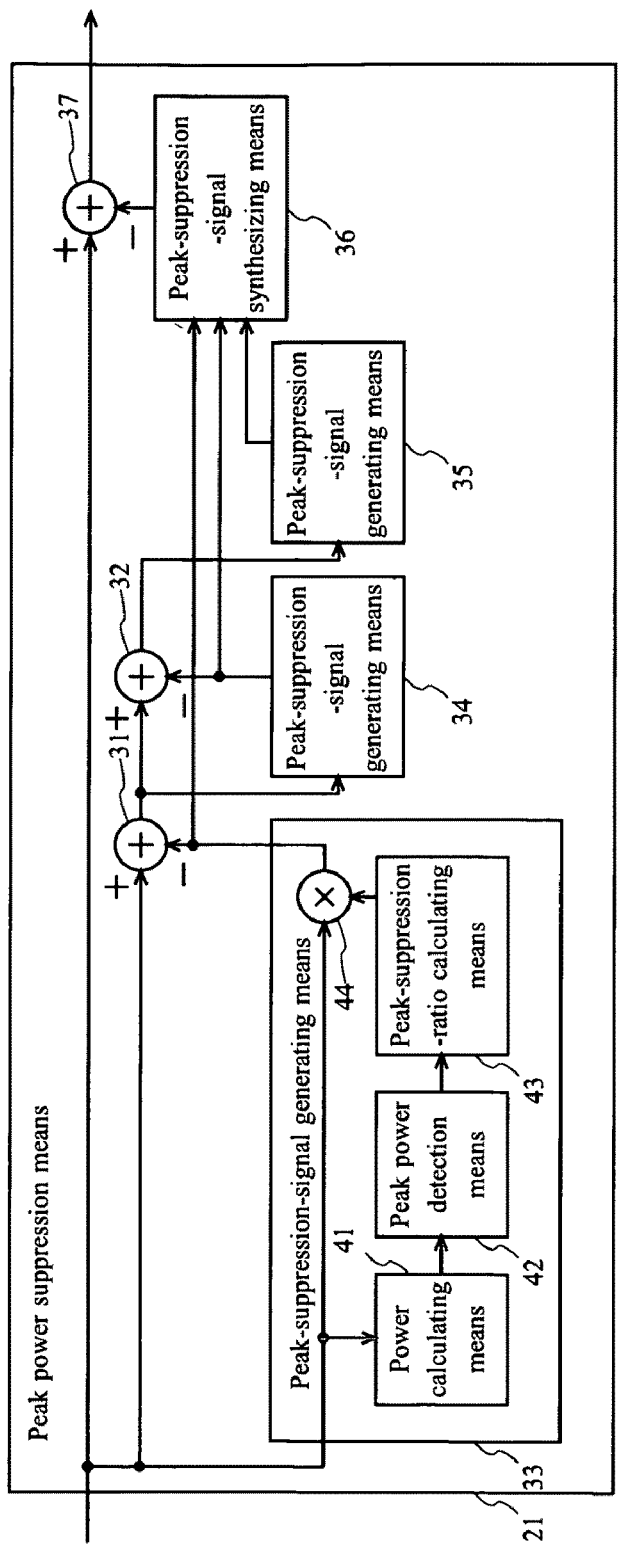
FIG. 2 shows a diagram showing a configuration example of peak power suppression means according to a second embodiment of the invention.

FIG. 2 shows a configuration example of peak power suppression means 21 according to an embodiment of the invention.

The peak power suppression means 21 of the embodiment includes two subtractors 31 and 32, three pieces of peak-suppression-signal generating means 33, 34 and 35, and a piece of peak-suppression-signal synthesizing means 36 for generating peak suppression signals, and a subtractor 37 for subtracting a peak suppression signal.

The peak-suppression-signal generating means 33 in a first stage has power calculating means 41, peak power detection means 42, peak-suppression-ratio calculating means 43, and a multiplier 44.

In the embodiment, other peak-suppression-signal generating means 34 and 35 have the same configuration or operation as that of the peak-suppression-signal generating means 33 in the first stage respectively.

An example of operation performed by the peak power suppression means 21 of the embodiment is shown.

A layout of the subtractors 31 and 32 in two stages, peak-suppression-signal generating means 33 to 35 in three stages, peak-suppression-signal synthesizing means 36, and subtractor 37, or overall operation performed by them are the same as operation described with reference to FIG. 1 according to the first embodiment. Therefore, in the embodiment, operation of the peak-suppression-signal generating means 33 is described in detail.

The power calculating means 41 calculates a power value Power for each sample from an I-phase component I and a Q-phase component Q of an input signal according to formula (4).

Formula 4

$$\text{Power} = I^2 + Q^2 \qquad \text{formula (4)}$$

The peak power detection means 42 compares a power value calculated by the power calculating means 41 to a threshold power value that is, for example, beforehand set, and determines a sample having a larger power value than the threshold power value as peak power.

The peak-suppression-ratio calculating means 43, for example, obtains a ratio of the peak power value Power to the threshold power value Thresh to calculate a suppression ratio for suppressing the peak power (peak suppression ratio). Various methods may be used as a method of calculating the peak suppression ratio. For example, a method of calculating the ratio according to formula (5) can be used.

The multiplier 44 multiplies an input signal into the peak-suppression-signal generating means 33 by the peak suppression ratio inputted from the peak-suppression-ratio calculating means 43, and outputs a result of the multiplication as a peak suppression signal.

Formula 5

$$\text{Peak suppression value} = 1 - \sqrt{\frac{\text{Thresh}}{\text{Power}}} \qquad \text{formula (5)}$$

As hereinbefore, in the peak power suppression means 21 of the embodiment, the N pieces of peak-suppression-signal generating means 33 to 35 include the power calculating means 41 that calculates a power value for each sample for each input signal, the peak power detection means 42 that compares the power value of the input signal calculated by the power calculating means 41 to a threshold power value being set, and determines a power value as a value of peak power when the power value is larger than the threshold power value, and the peak-suppression-ratio calculating means 43 that calculates a ratio of the peak power value detected by the peak power detection means 42 to the threshold power value so as to calculate a peak suppression ratio.

Embodiment 3

A third embodiment of the invention is described.

FIG. 3 shows a configuration example of peak power suppression means 51 according to an embodiment of the invention and carrier detection means 52.

The peak power suppression means 51 of the embodiment includes two subtractors 61 and 62, three pieces of peak-suppression-signal generating means 63, 64 and 65, and a piece of peak-suppression-signal synthesizing means 66 for generating peak suppression signals, and a subtractor 67 for subtracting a peak suppression signal.

The peak-suppression-signal generating means 63 in a first stage has power calculating means 71, peak power detection means 72, peak-suppression-ratio calculating means 73, and filter coefficient multiplication means 74.

In the embodiment, other peak-suppression-signal generating means 64 and 65 have the same configuration or operation as that of, for example, the peak-suppression-signal generating means 33 shown in FIG. 2, respectively.

The carrier detection means 52 detects a state of a carrier included in a signal to be a transmission object of a transmitter, and outputs a result of the detection to the filter coefficient multiplication means 74.

Such a function of the carrier detection means 52 is achieved by, for example, CPU (Central Processing Unit) of a controller provided in the transmitter. Alternatively, the function may be achieved by a configuration where a controller only for a limiter is provided, and the controller only for a limiter detects a carrier state informed by a general controller of a transmitter.

An example of operation performed by the peak power suppression means 51 of the embodiment is shown.

A layout of the subtractors 61 and 62 in two stages, peak-suppression-signal generating means 63 to 65 in three stages, peak-suppression-signal synthesizing means 66, and subtractor 67, or overall operation performed by them are the same as operation described with reference to FIG. 1 according to the first embodiment. In addition, operation of the peak-suppression-signal generating means 64 or 65 in a second or later stage is the same as operation of the peak-suppression-signal generating means 33 shown in FIG. 2. Therefore, in the embodiment, operation of the peak-suppression-signal generating means 63 in a first stage is described in detail.

In the peak-suppression-signal generating means 63 in the first stage, operation performed by each of the power calculating means 71, peak power detection means 72, and peak-suppression-ratio calculating means 73 is the same as operation performed by each of corresponding processing sections 41 to 43 provided in the peak-suppression-signal generating means 33 shown in FIG. 2.

The filter coefficient multiplication means 74 multiplies an I-phase component and a Q-phase component of a sample having peak power by a peak suppression ratio calculated by the peak-suppression-ratio calculating means 73 based on an input signal into the peak-suppression-signal generating means 63, and furthermore complex-multiplies each of the multiplied values by a complex filter coefficient according to formula (6), and thus generates a peak suppression signal, of which the frequency band is limited, for example, within the same frequency band as that of a transmission signal, and outputs the peak suppression signal. In the embodiment, a value adapted to a carrier state informed from the carrier detection means 52 is used as the complex filter coefficient.

Formula 6

$$\begin{aligned}
I \text{ phase of peak } suppresion \text{ signal} = \\
I \text{ phase of peak} \times \text{real part of filter coefficient} - \\
Q \text{ phase of peak} \times \text{imaginary} \\
\text{part of filter coefficient} \\
Q \text{ phase of peak } suppresion \text{ signal} = \\
Q \text{ phase of peak} \times \text{real part of filter coefficient} + \\
I \text{ phase of peak} \times \text{imaginary} \\
\text{part of filter coefficient}
\end{aligned} \qquad \text{formula (6)}$$

The embodiment is designed such that the peak-suppression-signal generating means 64 or 65 in the second or later stage has a different configuration from a configuration of the peak-suppression-signal generating means 63 in the first stage. However, as a different configuration, it is effective that peak-suppression-signal generating means in at least two stages subsequent to the first stage have the same configuration as that of the peak-suppression-signal generating means 63 in the first stage.

Generally, when a filter coefficient is used, a feature is given, that is, while degradation in spectrum waveform and degradation in signal quality is small, a peak cannot be securely reduced. On the other hand, when a filter coefficient is not used, a feature is given, that is, while degradation in spectrum waveform and degradation in signal quality is large, a peak can be securely reduced. To consider this, the embodiment uses both of the peak-suppression-signal generating means 63 that uses a filter coefficient, and the peak-suppression-signal generating means 64 and 65 that do not use a filter coefficient. In addition, the filter coefficient is preferably used in a previous stage side rather than a later stage side.

As hereinbefore, in the peak power suppression means 51 of the embodiment, among the N pieces of peak-suppression-signal generating means 63 to 65, M (M is an integer of 1 to N) pieces of peak-suppression-signal generating means in previous stages including the first stage use a filter coefficient so as to output a peak suppression signal being band-limited within the same frequency band as that of a transmission signal.

The embodiment may be configured such that a plurality of peak suppression signals being band-limited are synthesized so that any peak power is suppressed without causing degradation in spectrum waveform.

Embodiment 4

A fourth embodiment of the invention is described.

Figure 4:
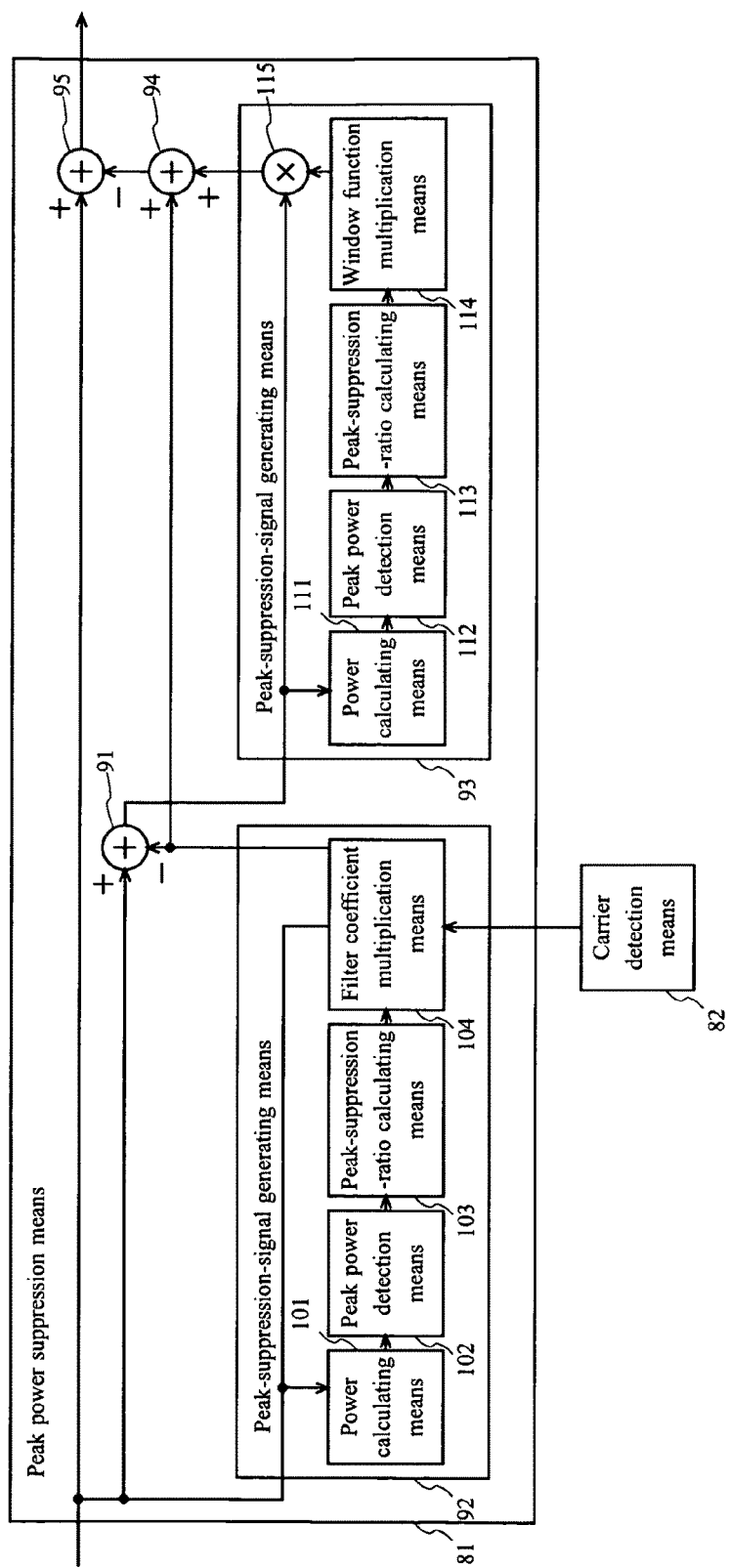
FIG. 4 shows a diagram showing a configuration example of peak power suppression means according to a fourth embodiment of the invention.

FIG. 4 shows a configuration example of peak power suppression means 81 according to an embodiment of the invention and carrier detection means 82.

The peak power suppression means 81 of the embodiment includes a subtractor 91, two pieces of peak-suppression-signal generating means 92 and 93, and an adder (peak suppression signal synthesizing means 94 for generating a peak suppression signal, and a subtractor 95 for subtracting a peak suppression signal.

The peak-suppression-signal generating means 92 in a first stage has power calculating means 101, peak power detection means 102, peak-suppression-ratio calculating means 103, and filter coefficient multiplication means 104.

The peak-suppression-signal generating means 93 in a second stage has power calculating means 111, peak power detection means 112, peak-suppression-ratio calculating means 113, window function multiplication means 114, and a multiplier 115.

A configuration or operation of the carrier detection means 82 is the same as that of the carrier detection means 52 shown in FIG. 3.

An example of operation performed by the peak power suppression means 81 of the embodiment is shown.

A layout of the subtractor 91 in one stage, peak-suppression-signal generating means 92 and 93 in two stages, adder 94, and subtractor 95, or overall operation performed by these is the same as operation described with reference to FIG. 1 according to the first embodiment except that the number of stages of each of the subtractor 91 and the two peak-suppression-signal generating means 92, 93 for generating a peak suppression signal. In addition, a configuration or operation of other band-limited peak-suppression-signal generating means 92 in the first stage is the same as that of the peak-suppression-signal generating means 63 in the first stage shown in FIG. 3. Therefore, in the embodiment, operation of the peak-suppression-signal generating means 93 in the second stage is described in detail.

In the peak-suppression-signal generating means 93 in the second stage, operation performed by each of the power calculating means 111, peak power detection means 112, and peak-suppression-ratio calculating means 113 is the same as operation performed by each of corresponding processing sections 101 to 103 provided in the peak-suppression-signal generating means 92 in the first stage.

The window function multiplication means 114 multiplies a peak suppression ratio inputted from the peak-suppression-ratio calculating means 113 by a window function, which is, for example, beforehand stored in a memory, and outputs a signal as a result of the multiplication to the multiplier 115. The window function w(t) is not particularly limited, and for example, each of the window functions as shown in formulas 1 to 3 can be used.

The windowing multiplier 115 multiplies the peak suppression ratio multiplied by the window function by an input signal from the subtractor 91 for each sample, and outputs a signal as a result of the multiplication as a peak-suppression-signal to the adder 94. According to such windowing, the peak-suppression-signal generating means 93 in the second stage generates a peak suppression signal of which the frequency band is controlled to be in a neighborhood of a carrier.

In the embodiment, the adder (peak suppression signal synthesizing means) 94 synthesizes two peak suppression signals outputted from the peak-suppression-signal generating means 92 in the first stage and the peak-suppression-signal generating means 93 in the second stage, and outputs a peak suppression signal (synthesized peak suppression signal) as a result of the synthesis to the subtractor 95. The subtractor 95 subtracts the synthesized peak suppression signal outputted from the adder 94 from the transmission signal, and outputs a transmission signal in which peak power is suppressed.

As hereinbefore, the peak power suppression means 81 of the embodiment internally includes the two pieces of peak-suppression-signal generating means 92 and 93, and the peak-suppression-signal generating means 92 in the first stage uses a filter coefficient to output a peak suppression signal being band-limited within the same frequency band as that of a transmission signal, and the peak-suppression-signal generating means 93 in the second stage multiplies a peak suppression ratio by a window function so as to output a peak suppression signal having a frequency band being controlled to be in a neighborhood of a carrier.

Therefore, the peak power suppression means 81 of the embodiment is configured such that the peak-suppression-signal generating means 92 in the first stage uses a filter coefficient, and the peak-suppression-signal generating means 93 in the second stage uses a window function, so that peak power can be effectively suppressed by the peak-suppression-signal generating means 92 and 93 in so small number of stages as two stages, consequently a circuit scale or cost can be reduced.

Next, a specific example of an advantage is shown, the advantage being obtained by the peak power suppression means 81 of the embodiment shown in FIG. 4.

In the embodiment, in both of a case of using the peak power suppression means 81 of the embodiment as shown in FIG. 4, and a case of using the peak power suppression means 201 according to a comparative art as shown in FIG. 13, threshold values for detecting peak power were set at the same level, and radio characteristics for a W-CDMA 2-carrier transmission signal, of which the carrier frequency was set to be ±2.5 MHz, were obtained by computer simulation.

FIG. 9 shows radio properties obtained by the computer simulation, which specifically shows radio properties of an output signal from the peak power suppression means when peak power is suppressed to the same PAPR level in each of the comparative art and the embodiment.

ACLR (Adjacent Channel Leakage Ratio) shows an out-of-band distortion level [dBc].

EVM (Error Vector Magnitude) shows magnitude [%] of an in-band error component (distortion) of a signal.

PCDE (Peak Code Domain Error) relates to error similarly as EVM, and shows badness [dB] of a code in W-CDMA when the code is demodulated by a receiver.

As shown in FIG. 9, when the peak power suppression means 81 of the embodiment is used, compared with a case of using the peak power suppression means 201 of the comparative art, signal quality is greatly improved in the case that peak power is suppressed to the same PAPR level. Thus, for example, when signal quality is allowed to be degraded to a level of a standard value of each radio characteristic (for example, a standard value of the 3GPP standard), achievable minimum PAPR can be set at a relatively low level.

For example, minimum PAPR satisfying a set standard (here, while a certain margin was added to the 3GPP standard, ACLR was set to be −60 dBc or less, EVM was set to be 10% or less, and PCDE was set to be −35 dB or less) was obtained by computer simulation. As a result, the PAPR was 6.7 dB in the peak power suppression means 201 according to the comparative art, and was 6.0 dB in the peak power suppression means 81 of the embodiment. Consequently, improvement in PAPR of about 0.7 dB was confirmed.

Figure 10:
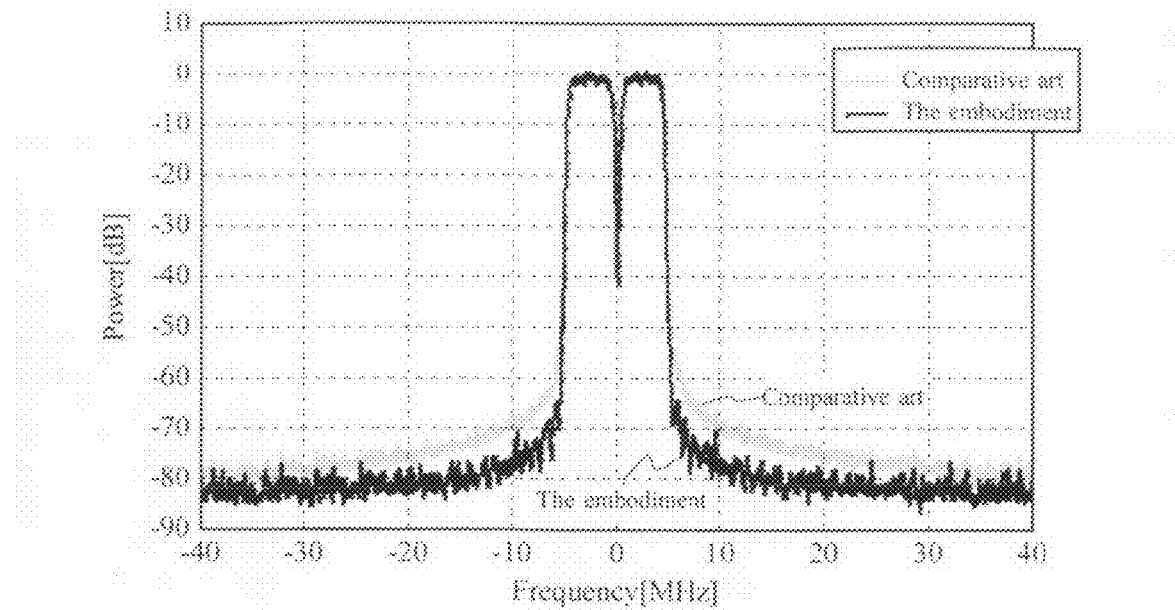
FIG. 10 shows a diagram showing an example of frequency spectra.

FIG. 10 shows an example of a waveform of a frequency spectrum of each of an output signal from the peak power suppression means 201 according to the comparative art, and an output signal from the peak power suppression means 81 of the embodiment. A horizontal axis of a graph shows frequency [MHz], and a vertical axis thereof shows power [dB].

Figure 11:
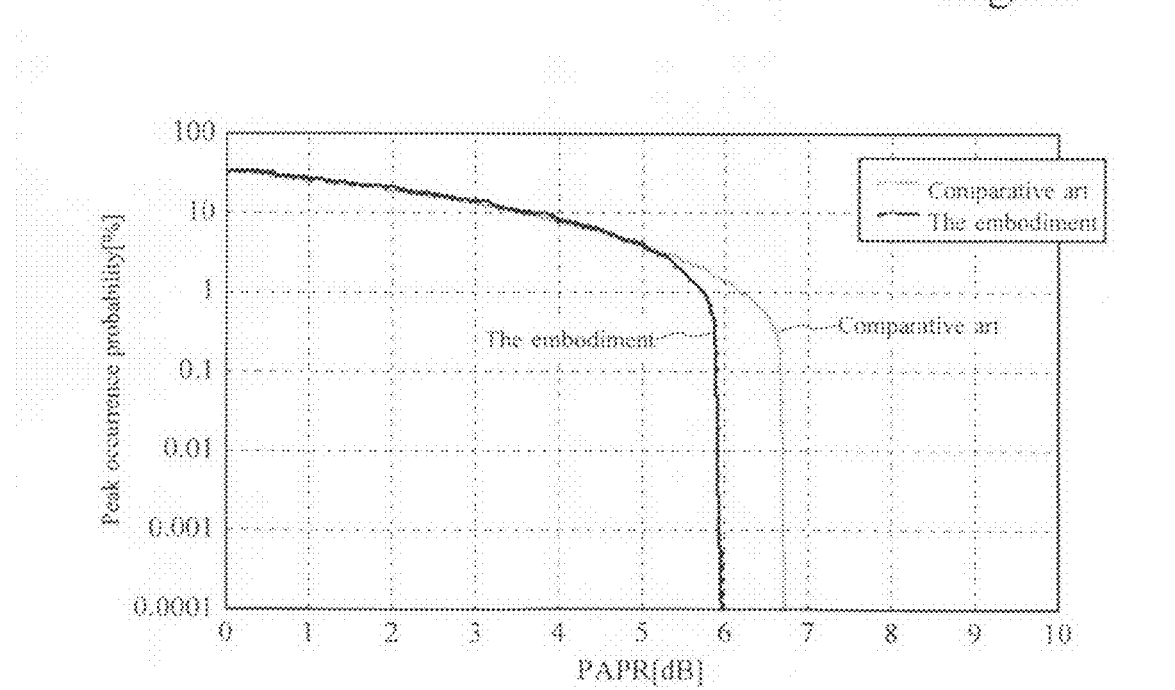
FIG. 11 shows a diagram showing an example of a complementary cumulative distribution function.

FIG. 11 shows an example of a curve of a complementary cumulative distribution function (CCDF) in the case that the minimum PAPR satisfying the set standard is achieved for each of the output signal from the peak power suppression means 201 according to the comparative art, and the output signal from the peak power suppression means 81 of the embodiment. A horizontal axis of a graph shows PAPR [dB], and a vertical axis thereof shows peak occurrence probability [%].

As shown by a result of the above computer simulation, the peak power suppression means 81 of the embodiment is used, thereby PAPR of a transmission signal can be reduced, and consequently a highly efficient power amplifier can be achieved.

Specifically, a band-limited peak suppression signal and a peak suppression signal being subjected to windowing are synthesized, thereby peak power suppression, which effectively greatly reduces PAPR, can be achieved while controlling increase in circuit scale.

Embodiment 5

A fifth embodiment of the invention is described.

The embodiment shows a different configuration example of the peak power suppression means 51 or 81 as shown in FIG. 3 or FIG. 4.

When an IF signal is subjected to peak power suppression, a filter coefficient for performing band limitation to a peak suppression signal is varied depending on frequency of each carrier included in a transmission signal.

In the embodiment, in a configuration where the number of patterns, which can be set for the number of carriers or frequency of each carrier in a transmission signal, is beforehand limitedly determined, a filter coefficient (in the embodiment, complex filter coefficient) depending on each carrier pattern that can be set is beforehand stored in a memory, and the filter coefficient multiplication means 74 or 104 selectively uses a filter coefficient depending on a set carrier pattern of a transmission signal at each point based on a stored content in the memory. The memory is provided in the filter coefficient multiplication means 74 or 104 or the like.

Frequency of each carrier included in a transmission signal is specified in each carrier pattern, and information for specifying a carrier pattern set at each point (carrier state) is detected by the carrier detection means 52 or 82, and informed to the filter coefficient multiplication means 74 or 104.

When a plurality of carriers are included in a transmission signal, a filter coefficient considering the plurality of carriers is used.

As hereinbefore, in the peak power suppression means 51 or 81 of the embodiment, the peak-suppression-signal generating means 63 or 92, which performs band limitation to a peak suppression signal, selectively uses a filter coefficient used for the band limitation from the filter coefficients being beforehand stored in the memory.

Embodiment 6

A sixth embodiment of the invention is described.

The embodiment shows a still different configuration example of the peak power suppression means 51 or 81 as shown in FIG. 3 or FIG. 4.

When an IF signal is subjected to peak power suppression, a filter coefficient for performing band limitation to a peak suppression signal is varied depending on frequency of each carrier included in a transmission signal.

In the embodiment, in a configuration where the number of patterns, which can be set for the number of carriers or frequency of each carrier in a transmission signal, is not limited, the filter coefficient multiplication means 74 or 104 generates a filter coefficient corresponding to an optional carrier frequency to be set based on a filter coefficient for a baseband signal, that is, 1-carrier signal having a carrier frequency of 0 MHz, and uses the generated filter coefficient.

The content of carrier frequency setting (carrier state) is informed from the carrier detection means 52 or 82 to the filter coefficient multiplication means 74 or 104.

Here, an example of a processing procedure is shown, according to which a filter coefficient corresponding to an optionally set, carrier frequency is produced based on a filter coefficient for a baseband 1-carrier signal.

The filter coefficient for the baseband 1-carrier signal is typically not a complex value. This is because of such a special case that carrier frequency is 0 MHz, and since a phase is not rotated, an imaginary part of the filter coefficient can be made to be 0 by fixing the phase at 0.

First, the filter coefficient tap[k] for the baseband 1-carrier signal is defined by formula (7). Here, length of the filter coefficient is assumed to be L, which is an odd number. In the embodiment, a transversal filter is used, and the filter coefficient corresponds to a tap coefficient.

Formula 7

$$\{\mathrm{tap}[k] | -(L-1)/2 \leq k \leq +(L-1)/2\} \qquad \text{formula (7)}$$

Next, a passband of a filter having the tap coefficient tap[k] as shown in formula (7) is subjected to frequency conversion by f1 ($=\omega 1/2\pi$) [MHz]. When a complex filter coefficient subjected to the frequency conversion is defined by formula (8), the complex filter coefficient is expressed by formula (9) and formula (10). Here, $tapi_1[k]$ shows a real part of the filter coefficient, and $tapq_1[k]$ shows an imaginary part of the filter coefficient.

Formula 8

$$\{(tapi_1[k], tapq_1[k])|-(L-1)/2 \leq k \leq +(L-1)/2\} \quad \text{formula (8)}$$

Formula 9

$$tapi_1[k] = tap[k] \times \cos(\omega 1 \cdot t + \theta)$$

however, $-(L-1)/2 \leq k \leq +(L-1)/2$ formula (9)

Formula 10

$$tapq_1[k] = tap[k] \times \sin(\omega 1 \cdot t + \theta)$$

however, $-(L-1)/2 \leq k \leq +(L-1)/2$ formula (10)

Here, in the embodiment, processing is performed in a digital area, and time t proceeds with a time span per sample. $\theta$ is a value of phase offset, and determined and set to be ($\omega 1 \cdot t + \theta = 0$) at a center position of a filter coefficient, namely, at k=0.

The formula (9) and formula (10) show quadrature modulation respectively.

Next, an example of a processing procedure is shown, according to which filter coefficients corresponding to a plurality of carrier frequencies are synthesized so as to generate a filter coefficient that can correspond to a multicarrier band.

A filter coefficient of a filter corresponding to frequency fn ($=\omega n/2\pi$) is defined by formula (11). Here, $tapin[k]$ shows a real part of the filter coefficient, and $tapqn[k]$ shows an imaginary part of the filter coefficient.

Formula 11

$$\{(tapi_n[k], tapq_n[k])|-(L-1)/2 \leq k \leq +(L-1)/2\} \quad \text{formula (11)}$$

A filter coefficient given by synthesizing filter coefficients corresponding to a plurality of (in the embodiment, n) frequencies f1, f2, ..., fn respectively is expressed by formula (12) and formula (13), which corresponds to multicarrier. Here, $tapi[k]$ shows a real part of the filter coefficient, and $tapq[k]$ shows an imaginary part of the filter coefficient.

Formula 12

$$tapi[k] = tapi_1[k] + tapi_2[k] + \ldots + tapi_n[k]$$

however, $-(L-1)/2 \leq k \leq +(L-1)/2$ formula (12)

Formula 13

$$tapq[k] = tapq_1[k] + tapq_2[k] + \ldots + tapq_n[k]$$

however, $-(L-1)/2 \leq k \leq +(L-1)/2$ formula (13)

When a plurality of filter coefficients are synthesized as in the embodiment, a gain may be varied. Therefore, the gain needs to be adjusted. For example, when filter coefficients corresponding to 2 carriers are synthesized, a synthesized filter coefficient is multiplied by ½ to fix a gain. Similarly, when filter coefficients corresponding to n carriers are synthesized, a synthesized filter coefficient is multiplied by 1/n.

Figure 5:
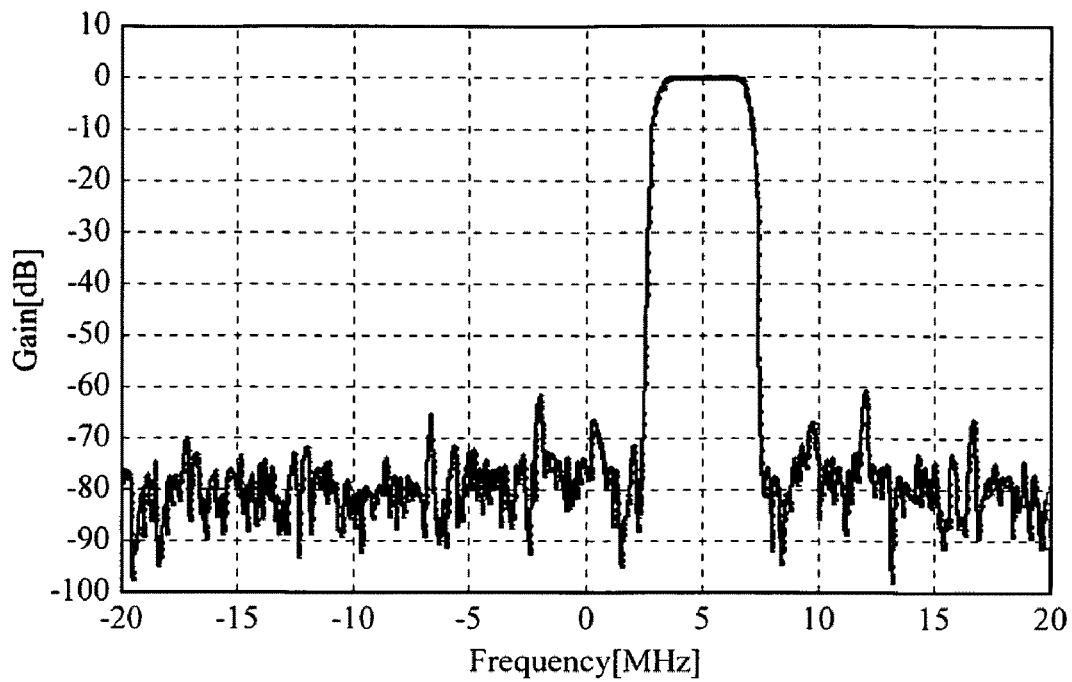
FIG. 5 shows a diagram showing an example of a transmission function of a filter coefficient according to a sixth embodiment of the invention.

FIG. 5 shows an example of a frequency response of a filter coefficient corresponding to a W-CDMA 1-carrier signal having a carrier frequency of +5 MHz, the filter coefficient being produced according to the procedure of the embodiment. A horizontal axis of a graph shows frequency [MHz], and a vertical axis thereof shows gain [dB].

Figure 6:
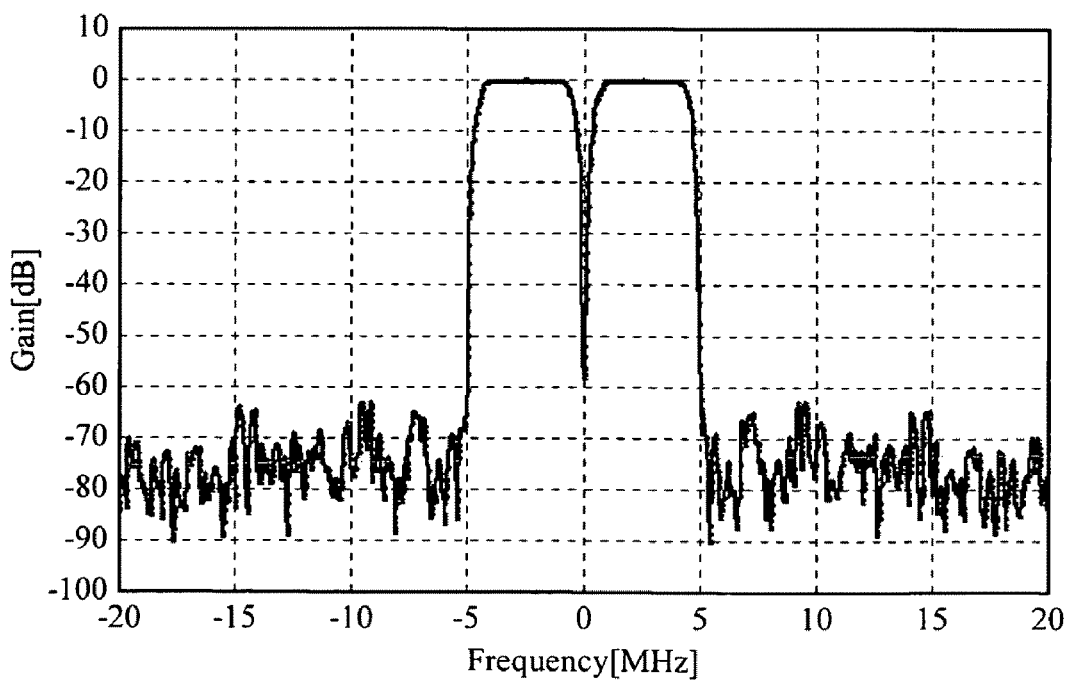
FIG. 6 shows a diagram showing an example of a transmission function of a filter coefficient according to a sixth embodiment of the invention.

FIG. 6 shows an example of a frequency response of a filter coefficient corresponding to W-CDMA 2-carrier signal having a carrier frequency of ±2.5 MHz, the filter coefficient being produced according to the procedure of the embodiment. A horizontal axis of a graph shows frequency [MHz], and a vertical axis thereof shows gain [dB].

As hereinbefore, in the peak power suppression means 51 or 81 of the embodiment, the peak-suppression-signal generating means 63 or 92, which performs band limitation to a peak suppression signal, performs quadrature modulation operation for each carrier to a filter coefficient corresponding to 1-carrier baseband signal, the filter coefficient being beforehand stored in a memory, depending on a carrier frequency of a transmission signal so as to change a passband, and synthesizes filter coefficients produced for each carrier, thereby the means 63 or 92 generates a filter coefficient having the same passband as a band of the transmission signal, and uses the generated filter coefficient for band limitation.

Embodiment 7

A seventh embodiment of the invention is described.

In FIGS. 1 to 4, a configuration example was shown, in which a plurality of peak-suppression-signal generating means were disposed in series within the peak power suppression means. However, various kinds of layout may be used. As another configuration example, a configuration where a plurality of peak-suppression-signal generating means are disposed in parallel, or a configuration where series layout is combined with parallel layout can be used.

Figure 12:
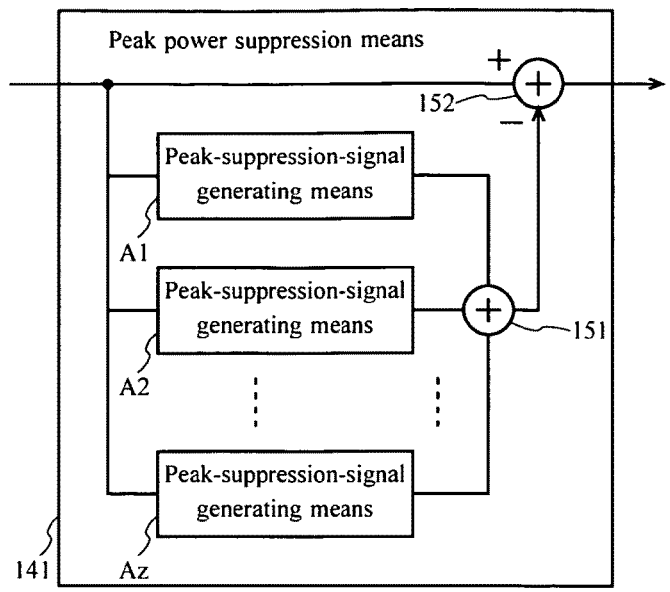
FIG. 12 shows a diagram showing a configuration example of peak power suppression means according to a seventh embodiment of the invention.

FIG. 12 shows a configuration example of peak power suppression means 141 according to an embodiment of the invention.

The peak power suppression means 141 of the embodiment includes the plural, z pieces of peak-suppression-signal generating means A1 to Az, an adder (peak-suppression-signal synthesizing means) 151, and a subtractor 152.

The peak-suppression-signal generating means A1 to Az are disposed in parallel.

As the peak-suppression-signal generating means A1 to Az, for example, those having different configurations from one another are preferably used. However, those having the same configuration may be used.

An example of operation performed by the peak power suppression means 141 of the embodiment is shown.

A transmission signal inputted into the peak power suppression means 141 is inputted into each of the peak-suppression-signal generating means A1 to Az and the subtractor 152.

Each of the peak-suppression-signal generating means A1 to Az generates a peak suppression signal for the inputted signal, and outputs the peak suppression signal to the adder 151.

The adder 151 sums (synthesizes) peak suppression signals inputted from the peak-suppression-signal generating means A1 to Az, and outputs a peak suppression signal (synthesized peak suppression signal) as a result of the sum to the subtractor 152.

The subtractor 152 subtracts the synthesized peak suppression signal inputted from the adder 151 from the signal (transmission signal) inputted into the peak power suppression means 141, and outputs a signal as a result of the subtraction as a transmission signal subjected to peak power suppression.

In the embodiment, a level adjuster is provided at a position between each of the peak-suppression-signal generating means A1 to Az and the adder 151, or at a position between the adder 151 and the subtractor 152, or at both the positions, and the relevant level adjuster performs level adjustment based on at least one kind of information such as an output level, the number of carriers, and the number of peak-suppression-signal generating means A1 to Az (the number of stages).

Embodiment 8

An eighth embodiment of the invention is described.

FIG. 7 shows a configuration example of a transmitter according to an embodiment of the invention.

The transmitter of the embodiment includes digital modulation means 121, peak power suppression means 122, a D/A (Digital to Analog) converter 123, and frequency conversion means 124.

As the peak power suppression means 122, those having various configurations shown in the embodiment may be used. Alternatively, peak power suppression means having a different configuration may be used.

An example of operation performed by the transmitter of the embodiment is shown.

The digital modulation means 121 performs band limitation for each carrier to, for example, an inputted multicarrier baseband signal, then upsamples the signal into a desired sampling frequency, and then performs digital quadrature modulation for each carrier signal into a desired IF band, and then performs multicarrier synthesis of the modulated signals and then outputs the synthesized signal to the peak power suppression means 122. Such operation of the digital modulation means is merely shown as an example, and the operation can be performed in various different ways, for example, band limitation may be performed after upsampling. Therefore, detailed internal operation of the means is not particularly concerned.

The peak power suppression means 122 suppresses peak power in a transmission signal inputted from the digital modulation means 121 to a threshold value level, and outputs a transmission signal subjected to the peak power suppression to the D/A converter 123.

The D/A converter 123 converts a digital transmission signal inputted from the peak power suppression means 122 into an analog signal, and outputs the analog signal to the frequency conversion means 124.

The frequency conversion means 124 is configured by an analog quadrature modulator, and performs frequency conversion of the signal inputted from the D/A converter 123 into a signal in a desired radio frequency (RF) band, and outputs the frequency-converted signal.

In the embodiment, the peak power suppression means 122 is disposed in a later stage (IF zone) of the digital modulation means 121. However, as a different configuration example, a configuration where the peak power suppression means 122 is disposed in a previous stage (BB zone) of the digital modulation means 121 may be used. In the case of using peak power suppression means in a method where a peak suppression signal is multiplied by a filter coefficient to perform band limitation as shown in FIG. 3 or FIG. 4, the peak power suppression means 122 is supposed to be disposed in the IF zone as in the embodiment.

Embodiment 9

A ninth embodiment of the invention is described.

FIG. 8 shows a configuration example of a transmit amplifier according to an embodiment of the invention.

The transmit amplifier of the embodiment includes digital modulation means 131, peak power suppression means 132, a D/A converter 133, frequency conversion means 134, and a power amplifier 135.

An example of operation performed by the transmit amplifier of the embodiment is shown.

A configuration or operation of each of the digital modulation means 131, peak power suppression means 132, D/A converter 133, and frequency conversion means 134 is the same as that of each of corresponding processing sections 121 to 124 as shown in FIG. 7.

The power amplifier 135 is inputted with a signal outputted from the frequency conversion means 134, and performs power amplification to the relevant input signal and outputs the signal subjected to power amplification. Generally, when peak power exists in a signal to be inputted into an amplifier, distortion occurs in an amplified signal. Therefore, peak power included in a signal (transmission signal) to be an amplification object is effectively suppressed as in the embodiment.

Embodiment 10

A tenth embodiment of the invention is described.

The embodiment shows a configuration example where on/off control is performed to a peak power suppression function.

Figure 14:
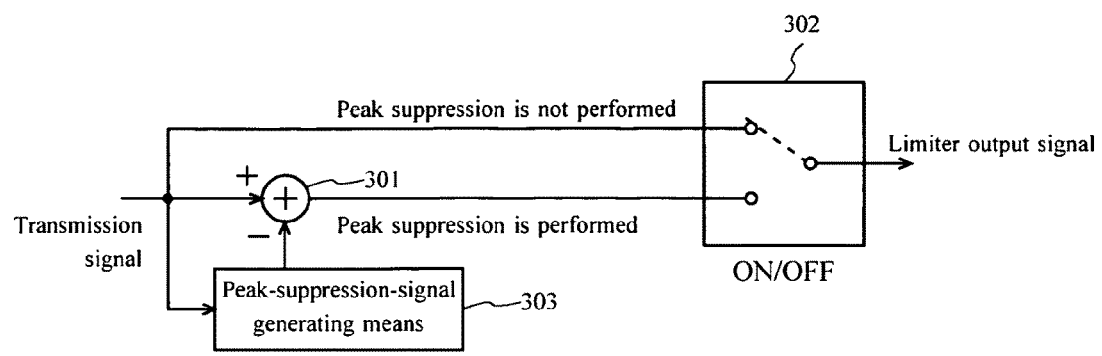
FIG. 14 shows a diagram showing an example of a configuration of performing on/off control of a peak power suppression function according to a tenth embodiment of the invention.

FIG. 14 shows a subtractor 301 and a switch 302 as a configuration example where on/off control is performed to a peak power suppression function, which corresponds to a configuration example of part of peak power suppression means or the like.

As the peak power suppression means, those having various configurations shown in the embodiment may be used. Alternatively, peak power suppression means having a different configuration may be used.

The subtractor 301 subtracts a peak suppression signal (in the embodiment, synthesized peak suppression signal) from an inputted transmission signal, and outputs a signal as a result of the subtraction as a transmission signal subjected to peak power suppression to the switch 302. A component using a transmission signal to generate the peak suppression signal (in the embodiment, synthesized peak suppression signal) is omitted to be illustrated or described.

The subtractor 301 corresponds to, for example, the subtractor 17 shown in FIG. 1, subtractor 37 shown in FIG. 2, subtractor 67 shown in FIG. 3, subtractor 95 shown in FIG. 4, or subtractor 152 shown in FIG. 12.

The switch 302 has a function of switching between a state where the transmission signal, which is subjected to peak power suppression, to be outputted from the subtractor 301 is outputted from the peak power suppression means, and a state where a transmission signal being not subjected to peak power suppression, for example, a transmission signal as inputted is outputted from the peak power suppression means. Such switching operation of the switch 302 is controlled by, for example, an internal or external control function of the peak power suppression means. Moreover, the switching operation of the switch 302 may be controlled by operation by a user (person), or may be controlled based on a switching condition being beforehand set.

In this way, in the configuration of the embodiment, an on/off state of the peak power suppression function can be switched. Particularly, in the peak power suppression means shown in the embodiment, a plurality of peak suppression signals are synthesized into one. Therefore, when the peak suppression signals are subjected to processing or operation, it is only necessary to perform processing or operation to the synthesized peak suppression signal at one point, consequently a configuration or control is simplified. This is an advantage of a configuration where a plurality of peak suppression signals are synthesized as in the embodiment.

As a specific example, in a device such as transmitter, a test pattern signal is often flowed into a device (device including peak power suppression means) in adjustment of the device before shipment, which is performed, for example, in the case that a continuous wave is transmitted to obtain an initial setting value of a distortion compensation coefficient. In such a case, the peak power suppression function is sometimes necessarily or desirably turned off to avoid a test pattern signal from being changed with peak power suppression.

On the contrary, in the configuration where on/off control is performed to the peak power suppression function as in the embodiment, for example, a switch 302 is provided in a later stage of the peak suppression signal synthesizing means or the subtractor 301 in the peak power suppression means, and the switch is controlled, whereby the on/off control can be simply achieved. Consequently, the on/off control of the peak power suppression function can be achieved by a simple configuration and simple control.

As a configuration of a system or an apparatus according to the invention is not limited to those as shown in the above, and various configurations may be used for them. Moreover, the invention can be provided, for example, as a method or scheme for performing processing according to the invention, a program for achieving such a method or scheme, or a recording medium for recording the program. Alternatively, the invention can be provided as one of various systems or apparatuses.

An application field of the invention is not limited to those as shown in the above, and the invention can be applied to various fields.

For various kinds of processing performed by the system or apparatus according to the invention, a configuration may be used, in which a hardware resource has a processor, memory or the like, and the processor executes a control program stored in ROM (Read Only Memory), so that the processing is controlled. Alternatively, each functional unit for performing the relevant processing may be configured as an independent hardware circuit.

Moreover, the invention can be understood as a computer-readable recording medium such as floppy (registered trademark) disk or CD (Compact Disc)-ROM, those storing the control program, or understood as the program (itself). The control program is inputted from the recording medium into a computer and executed by a processor, thereby the processing according to the invention can be performed.

As described hereinbefore, in the invention, peak suppression signals generated by a plurality of peak-suppression-signal generating means are synthesized, and a signal (synthesized peak suppression signal) as a result of the synthesis is subtracted from a transmission signal, thereby peak power occurring in the transmission signal can be effectively suppressed.

The invention claimed is:

1. A transmitter that suppresses peak power in a transmission signal, comprising:
a plurality of peak-suppression-signal generating means that generates peak suppression signals for suppressing peak power in the transmission signal respectively,
a peak-suppression-signal synthesizing means that synthesizes peak suppression signals generated by the plurality of peak-suppression-signal generating means, and
a subtraction means that subtracts a signal as a synthesis result given by the peak-suppression-signal synthesizing means from the transmission signal,
wherein the plural, N pieces of the peak-suppression-signal generating means are provided, and disposed in series,
(N−1) pieces of suppression signal subtraction means are provided while being disposed in series,
a peak-suppression-signal generating means in a first stage is inputted with the transmission signal and generates a peak suppression signal,
a suppression signal subtraction means in a first stage subtracts the peak suppression signal, being generated by the peak-suppression-signal generating means in the first stage, from the transmission signal,
a suppression signal subtraction means in an ith (i=2 to N−1) stage subtracts a peak suppression signal, being generated by peak-suppression-signal generating means in an ith stage, from a signal as a subtraction result given by (i−1)th suppression signal subtraction means, and
a peak-suppression-signal generating means in a jth (j=2 to N) stage is inputted with a signal as a subtraction result given by suppression signal subtraction means in a (j−1)th stage.

2. The transmitter according to claim 1, wherein
at least one piece of peak-suppression-signal generating means among the plurality of peak-suppression-signal generating means generates a peak suppression signal being band-limited using a filter coefficient.

3. The transmitter according to claim 2, wherein
two pieces of peak-suppression-signal generating means are provided as the plurality of peak-suppression-signal generating means, and
a peak-suppression-signal generating means in a first stage in the two pieces of peak-suppression-signal generating means uses a filter coefficient to output a peak suppression signal being band-limited within the same frequency band as that of the transmission signal, and
a peak-suppression-signal generating means in a second stage in the two pieces of peak-suppression-signal generating means multiplies a peak suppression ratio by a window function so as to output a peak suppression signal having a frequency band being controlled to be in a neighborhood of a carrier.

4. The transmitter according to claim 2, wherein
at least one piece of peak-suppression-signal generating means among the plurality of peak-suppression-signal generating means generates a peak suppression signal being band-limited using a filter coefficient,
the transmitter further includes a storage means that stores correspondence between a frequency pattern of a carrier included in the transmission signal and a filter coefficient, and a carrier detection means that detects the frequency pattern of the carrier included in the transmission signal, and
the peak-suppression-signal generating means using the filter coefficient uses a filter coefficient corresponding to a pattern detected by the carrier detection means based on the stored content in the storage means.

5. The transmitter according to claim 2 wherein,
at least one piece of peak-suppression-signal generating means among the plurality of peak-suppression-signal generating means generates a peak suppression signal being band-limited using a filter coefficient,
the transmitter further includes a storage means that stores a filter coefficient corresponding to a 1-carrier baseband signal, and a carrier detection means that detects frequency of a carrier included in the transmission signal, and the peak-suppression-signal generating means using the filter coefficient changes a passband of the filter coefficient stored in the storage means for each frequency of each carrier detected by the carrier detection means so that the passband overlaps with a frequency band of each of the carriers, and thus synthesizes filter coefficients produced for each frequency of each of the carriers, and uses a filter coefficient as a result of the synthesis.

6. A transmitter that suppresses peak power in a transmission signal, comprising:

a plurality of peak-suppression-signal generating means generates peak suppression signals for suppressing peak power in the transmission signal respectively, a peak-suppression-signal synthesizing means that synthesizes peak suppression signals generated by the plurality of peak-suppression-signal generating means, and a subtraction means that subtracts a signal as a synthesis result given by the peak-suppression-signal synthesizing means from the transmission signal, wherein at least one piece of peak-suppression-signal generating means among the plurality of peak-suppression-signal generating means includes:

a power calculating means that calculates a power value for each sample for an input signal, a peak power detection means that compares a power value of the input signal calculated by the power calculating means to a threshold power value being set, and determines the power value as a value of peak power when the power value is larger than the threshold power value, and a peak-suppression-ratio calculating means that calculates a ratio of the peak power value detected by the peak power detection means to the threshold power value so as to calculate a peak suppression ratio.

* * * * *